United States Patent [19]

Sanders et al.

[11] Patent Number: 6,069,539
[45] Date of Patent: May 30, 2000

[54] VTT POWER DISTRIBUTION SYSTEM

[75] Inventors: David K. Sanders, Los Gatos; Sergio D. Camerlo, Cupertino, both of Calif.

[73] Assignee: Cisco Technology, Inc., San Jose, Calif.

[21] Appl. No.: 09/322,113

[22] Filed: May 27, 1999

[51] Int. Cl.[7] .................................................. H01P 1/26
[52] U.S. Cl. ........................................ 333/22 R; 333/124
[58] Field of Search ................................. 326/80, 82, 86, 326/30; 333/22 R, 124, 100

[56] References Cited

U.S. PATENT DOCUMENTS

| 5,023,488 | 6/1991 | Gunning . | |
| 5,677,651 | 10/1997 | Crane | 333/22 R |
| 5,945,886 | 8/1999 | Millar | 333/1 |

OTHER PUBLICATIONS

AN–1065, National Semiconductor, Santa Clara, CA.
AN–1070, National Semiconductor, Santa Clara, CA.
AN–1094, National Semiconductor, Santa Clara, CA.
GTLP16612, National Semiconductor, Santa Clara, CA.
JEDEC JESD8–3, Electronic Industry Assn, Arlington, VA.

*Primary Examiner*—Michael Tokar
*Assistant Examiner*—Anh Tran
*Attorney, Agent, or Firm*—Jay A. Chesavage

[57] ABSTRACT

A system for the distribution of VTT termination voltage for a GTL bus system includes a plurality of GTL signal lines, a plurality of first termination resistors, and a plurality of second termination resistors. The GTL signal lines have a first end and a second end. The resistors have a signal end and a VTT end. The first end of the signal line is connected to the signal end of the first resistor. The second end of the signal line is connected to the signal end of the first resistor. A plurality of nodes are formed from the VTT ends of the first and second resistors. These nodes may be formed in many different ways, and in many different numbers. The nodes are each driven with a separate VTT supply, and the nodes are interconnected such that a failure in the power supply furnishing power to one node does not affect the other nodes, and does not affect the operation of the system consuming this VTT voltage.

22 Claims, 3 Drawing Sheets

GTL bus with 3 VTT nodes

3 Node VTT, equivalent cricuit

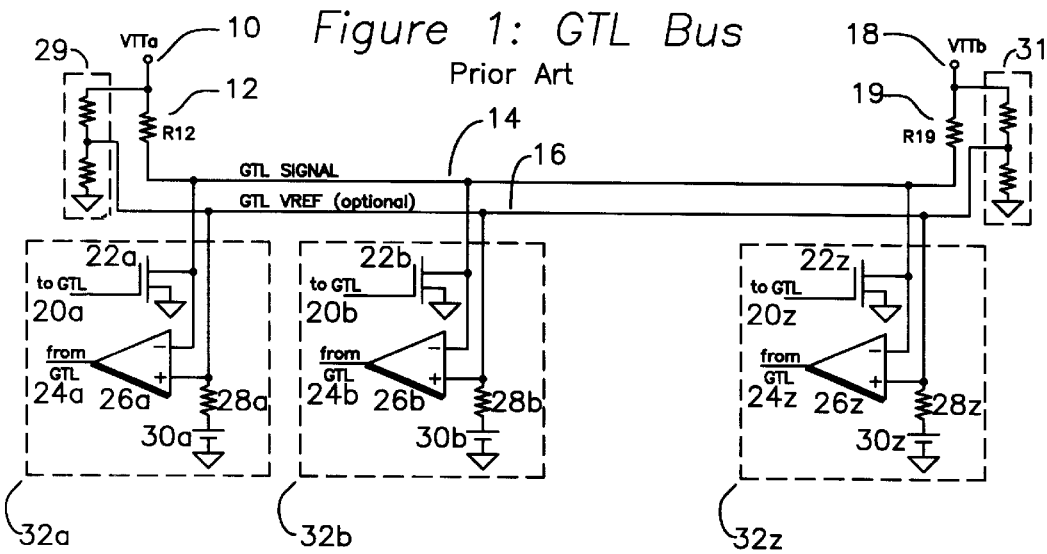
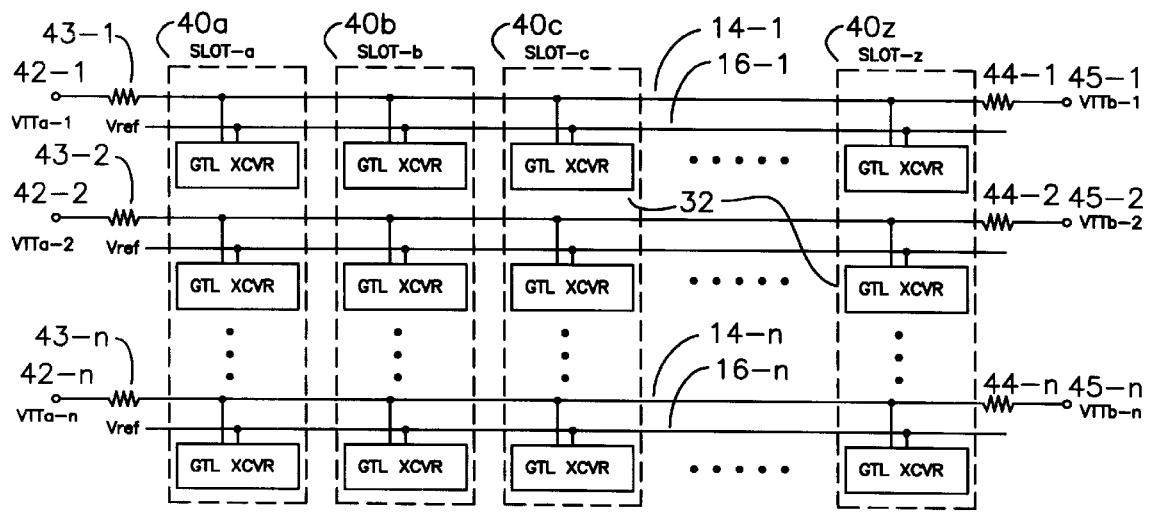

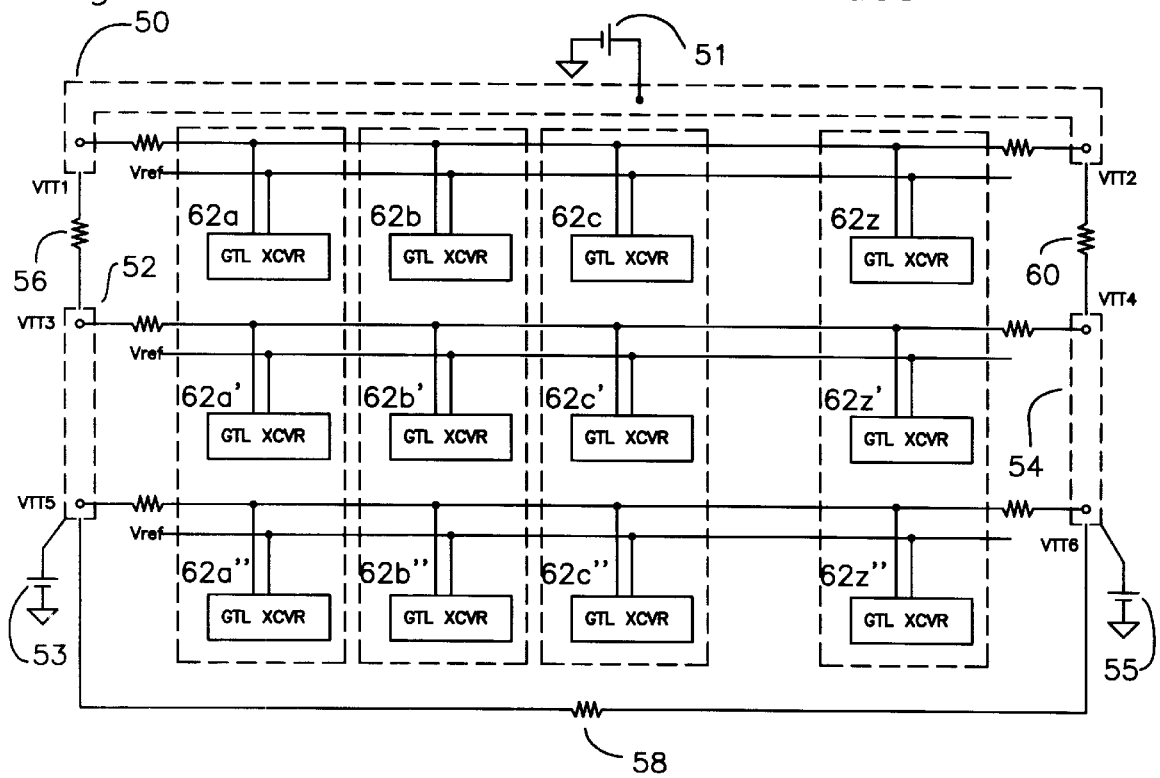
Figure 3: GTL bus with 3 VTT nodes
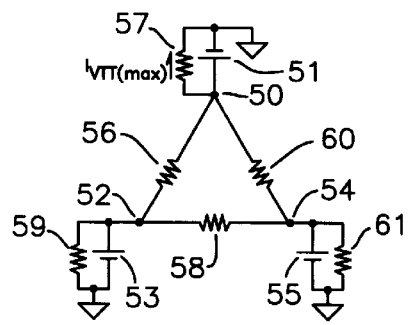
Figure 4: 3 Node VTT, equivalent cricuit

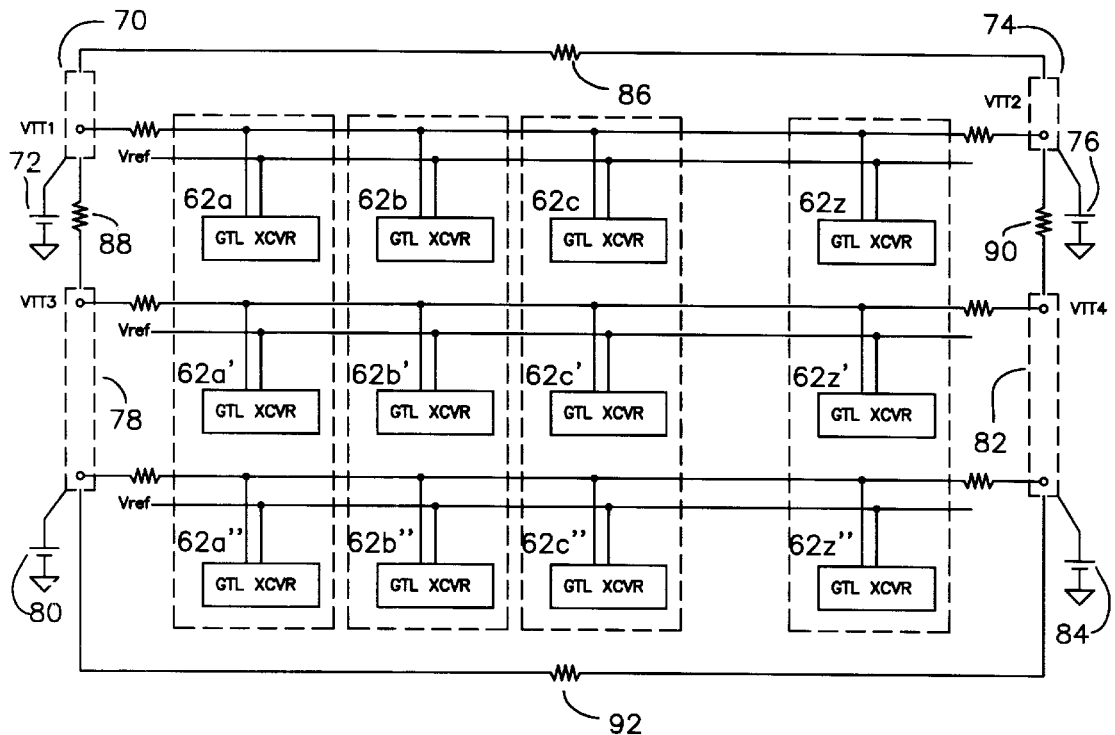
Figure 5: GTL bus with 4 VTT nodes
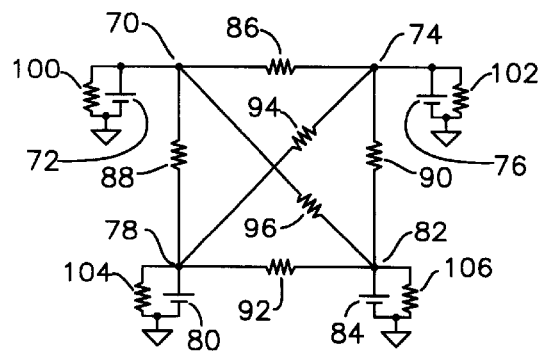
Figure 6: 4 node VTT, equivalent circuit

VTT POWER DISTRIBUTION SYSTEM

FIELD OF THE INVENTION

This invention is directed to the class of distributed power supplies for a backplane bus termination systems, wherein termination resistors for a GTL (Gunning Transceiver Logic) bus system receive power from a plurality of sources, and a failure in any one or more VTT sources does not cause a failure in the signal termination system utilizing these termination resistors.

BACKGROUND OF THE INVENTION

The GTL bus was first described in U.S. Pat. No. 5,023,488 by Gunning, and is described in JEDEC (Joint Electronic Device Engineering Council) standard JES08-3 from the Electronics Industry Association of Arlington, Va. The basic elements of a GTL bus are a GTL signal line with low transmission line impedance (typically 50 ohms), a plurality of open-collector or open-drain loads driving this line, and matched termination resistors sourcing a VTT voltage, typically in the range of 1.5 V. The peak to peak voltage swing of the bus is limited to the range of 0.6 to 0.85 V, and input devices compare the voltage level of the bus to an internal reference voltage $V_{ref}$ to determine whether the logic level on the GTL line is one or zero. There are several manufacturers offering GTL transceivers with slightly different output and input voltage specifications from those described above, but the basic operation described above is preserved. One manufacturer of GTL bus parts is National Semiconductor Inc, of Santa Clara, Calif., which manufacturers a GTLP bus transceiver GTLP16612. Another manufacturer is Texas Instruments Inc, of Dallas, Tex., which manufacturers a GTL bus transceiver GTL16612. While the output voltage swing, $V_{ref}$ voltage, and VTT voltages are slightly different between these transceivers from these two manufacturers, they share common features in operation, and both require a VTT supply, and both produce $V_{ref}$, or optionally have a local copy of $V_{ref}$ derived from VTT for use in determining the input switching threshold voltage. Detailed information on GTL may be obtained in application notes AN-1065An-1070, An-1094, and GTL data sheet GTLP16612, all available from National Semiconductor Inc, and incorporated herein by reference.

SUMMARY OF THE INVENTION

The present invention divides VTT into a plurality of VTT sources which are resistively inter-connected by a plurality of resistors having a resistance chosen to enable current sharing between sources and to provide power to the transceivers serviced by a failed VTT source.

BRIEF DESCRIPTION OF THE DRAWINGS

FIG. 1 shows the topology for a GTL bus with a single GTL signal line and multiple transceivers.

FIG. 2 shows the topology for a GTL bus with a plurality of signal lines and a plurality of slot accesses.

FIG. 3 shows a GTL bus with 3 VTT nodes connected with current sharing resistors.

FIG. 4 is the equivalent circuit for the VTT circuit of FIG. 3.

FIG. 5 shows a GTL bus with 4 VTT nodes connected to current sharing resistors.

FIG. 6 shows the equivalent VTT circuit of FIG. 5.

DETAILED DESCRIPTION OF THE INVENTION

FIG. 1 shows a prior art GTL signal. VTTa 10 and VTTb 18 are typically a single VTT power supply distributed to both these points. A $V_{ref}$ source 29 and 31 is shown as a resistive divider, and produces and distributes $V_{ref}$ 16 to all of the transceivers 32 in a bus system. The distribution of an external $V_{ref}$ 16 is optional, as each transceiver 32 has a means for producing a local $V_{ref}$ 30. A GTL signal line 14 is doubly terminated by termination resistors 12 and 19. Each of the transceivers 32 of FIG. 1 has a suffix letter to indicate which card position it occupies. For example, transceiver 32a occupies the first slot, and all of its components end in the suffix a to denote association with this slot. Transceiver 32a comprises input difference amplifier 26a, which has a local Vref 30a which is sourced through coupling resistor 28a in the event that an external $V_{ref}$ 16 is not supplied or connected. In this manner, the transceiver may operate correctly whether or not an external $V_{ref}$ is present, and for the purposes of the remainder of the description, $V_{ref}$ 16 will refer to the switching threshold voltage used by each comparator 26, whether $V_{ref}$ 16 is internally or externally provided. $V_{ref}$ 16 is compared with the GTL signal 14, and an output 24a indicates that the GTL signal 14 is high or low. The technique of comparing the GTL signal 14 with $V_{ref}$ 16 improves the noise immunity of the system, as ground noise doesn't easily couple into $V_{ref}$ 16. The transceiver 32 output driver 22 drives the GTL signal 14 low, and the termination resistors 12 and 19 pull the GTL signal high when no GTL output driver 22 is driving the GTL signal low. The typical output low voltages for a GTL bus are 0.4 to 0.65 V, and the output high voltage is VTT, which is typically 1.2 to 1.5 V. The typical GTL p-p output swing is 800–850 mV. In this manner, each transceiver 32a–32z is capable of either driving the GTL signal 14, or decoding a level from the GTL signal. The GTL terminations 12 and 19 terminate the transmission lines formed by the GTL lines spanning the backplane, and also serve to pull the GTL lines to VTT when no driver 22 is active. The GTL system has the advantage of high speed drive, good signal integrity because of the bus termination at each signal end, and good performance in systems where there are many such transceivers 32a–z, each driving or receiving GTL signals from a bus formed by a plurality of such GTL signals. In contrast with other prior art bus systems, where a local transceiver is responsible for the provision of drive current that flows onto the bus, the GTL system of FIG. 1 provides termination resistors 12 and 19, which are typically located at the opposite ends of the system bus 14. This means that the GTL termination resistors 12 and 19 provide the power required for the bus to operate, and the maximum current through each termination resistor is (VTT−VL)/(R12), assuming the typical case of R19=R12, VTT=VTTa=VTTb, and VTT−VL=0.85 V. The values of R12 and R19 are related to the intrinsic impedance of the backplane bus line 14, and may typically be found on the order of 50 ohms. The use of a single VTT supply for the communication of the cards with each other also means that the reliability of the entire system is dependant on the VTT supply. In actual practice, Vtta 10 and Vttb 18 are tied together electrically through a printed wiring trace, resulting in small differences in potentials which may appear from Vtta to Vttb across the backplane.

FIG. 2 shows a GTL bus with slot access and a plurality of VTT access points. In this case, a plurality of slots is defined as slot-a 40a, slot-b 40b through slot-z 40z. In this typical backplane configuration, each slot has access to a plurality of GTL signals 14-1 through 14-n and $V_{ref}$ voltages 16-1 through 16-n. The $V_{ref}$ voltages 16-1 through 16-n may be distributed as a single $V_{ref}$ voltage line, or as a plurality of $V_{ref}$ voltages, or each GTL signal line may be accompanied by a VTT reference voltage, as shown in FIG. 2. The GTL transceivers 32 each represent a transceiver of the type 32a through 32z of FIG. 1. In this manner, a card inserted into slot-a 40a through slot-z 40z may control a plurality of GTL signals 14-1 through 14-n in a system, and each signal is doubly terminated by termination 43-1 through 43-n and 44-1 through 44-n, thereby ensuring good signal integrity of the GTL bus. In FIG. 2, each VTT source 42-1, 42-2, through 42-n and 45-1, 45-2, through 45-n may be connected to a single VTT source, which is typically 2 V. If a single VTT were used, the loss of VTT would cause the complete failure of the GTL bus, as each GTL signal 14-1 through 14-n would be now pulled to 0 volts through the termination resistors 43-1 through 43-n and 44-1 through 44-n, since the transceiver is not capable of driving its GTL signal high.

FIG. 3 shows a GTL bus with 3 VTT nodes. In this example, VTT is separated into 3 nodes, VTT1 and VTT2 50, VTT3 and VTT5 52, and VTT4 and VTT6 54. These 3 nodes are interconnected using current sharing resistor 56 for nodes 50 and 52, resistor 60 for nodes 50 and 54, and resistor 58 for nodes 52 and 54. The resistors 56, 58, and 60 are chosen so that only one or two of the three VTT supplies 51, 53, and 55 need to be present for the GTL bus to continue operating. When a power supply fails, a small drop is noted in both the GTL signal 14, and $V_{ref}$ 16. If $V_{ref}$ is divided down from VTT, then $V_{ref}$ will track VTT by the divider ratio. If $V_{ref}$ is created by subtracting a fixed offset from VTT, then the difference between $V_{ref}$ and VTT will stay fixed. Thereafter, the differential voltage (Vgtl−Vdrop)−($V_{ref}$−Vdrop) seen by each comparator 26 is only slightly changed, as Vdrop is designed to be small. This common mode voltage drop Vdrop may be computed as $$Vdrop = (R56/2) * I_{VTTlost}$$

where

R56=R58=R60, and $I_{VTTlost}$ =current formerly flowing through Vtt that was lost as a result of failure. Typically, R56, R58, and R60 are chosen such that Vdrop<0.05 VTT, or R56<2(0.05)VTT/$I_{VTT(max)}$, where $I_{VTT(max)}$ is the maximum current that would be sourced by any one VTT. The distribution of VTT nodes across GTL termination resistors may be accomplished in many ways. In FIG. 3, VTTa-1 through VTTa-n could be divided into three groups, denoted as VTT1, VTT3, and VTT5. Similarly, VTT2, VTT4, and VTT6 represent the three groupings of VTTb-1 through VTTb-n. In the interest of sharing load currents across the three VTT supplies 51, 53, and 55, it may be useful to distribute equal number of transceivers across VTT1 through VTT6, and it is often convenient to form a node from termination resistors which are adjacent to each other. In the structure of FIG. 2, the GTL signal lines 14-1 through 14-n and $V_{ref}$ lines 16-1 through 16-n are often parallel data lines spanning all of the vertical (or horizontal) slots a through z. In this case, the number of VTT supplies=3, and if a 240 bit GTL bus were in use, there would be 240 terminations at each end, or 480 termination connections. One balanced connection topology would be 80 VTT GTL signals distributed to each of VTT1 and VTT2, 160 connections terminated to VTT3 and VTT5, and 160 GTL connections terminated at VTT4 and VTT6. Since VTT1 and VTT2 span the full width of the backplane, node 50 would be formed from a wide connection trace which would be as long as the GTL traces spanning slots a through z. Nodes 52 and 54 would be confined to the group of serviced GTL transceivers of VTT3, VTT5, and VTT4, VTT6, respectively. In this manner, the 480 GTL termination currents are uniformly distributed across all of the power supplies. It is clear to one skilled in the art that there are many such connections that are available for distributing these GTL terminations across a plurality of VTT nodes.

FIG. 4 shows the equivalent circuit of FIG. 3, but with the GTL transceivers and terminations shown as single loads. In FIG. 4, the three VTT sources are shown as 51, 53, and 55, the current sharing resistors are shown as 56, 58, and 60, and the composite VTT termination resistors and transceiver loads as 57, 59, and 61. $I_{VT(max)}$ is the maximum current drawn by a particular load, as shown for the example case of load 57. When one of the VTT supplies 51, 53, or 55 fails, the remaining operating VTT supplies furnish the required current to the failed node through the sharing resistors 56, 58, and 60. The choice of resistor values for 56, 58, and 60 is governed by a tradeoff between current sharing and voltage drop incurred upon loss of a supply. Current sharing may be desirable in the case where it is important for the VTT supplies to maintain an output current at all times.

FIG. 5 shows the case where the number of VTT sources is four. For the earlier case of 240 lines, or 480 transceiver terminations, each VTT node VTT1, VTT2, VTT3, and VTT4 would support 120 transceivers, which could be arranged in many different ways. For example, the top 120 lines could terminate to node 70 on one end of the GTL bus, and to node 74 on the other end of the GTL bus, and the bottom 120 lines could terminate to node 78 on one end of the GTL bus, and to node 82 on the opposite end. VTT sources VTT1 72, VTT2 76, VTT3 80, and VTT4 84 are interconnected with current sharing resistors 86, 88, 90, and 92.

FIG. 6 shows the equivalent circuit for the case of FIG. 5. VTT supplies 72, 76, 80, 84, and GTL termination resistors and transceivers shown as lumped loads 100, 102, 104, and 106. Current sharing resistors 76, 86, 88, and 92 interconnect nodes as in FIG. 5. For better current sharing, it would be possible to employ a full mesh of current sharing resistors, optionally including 94 and 96, as shown. In general, the number of resistors required for a full mesh connection of m nodes is (m−1)+(m−2)+. . . 1.

It should be clear to one skilled in the art that many other implementations of the described invention are possible. Although the cases of three and four VTT supplies were shown to demonstrate the advantages of the invention, it is clear that as few as two, or an unlimited number of VTT supplies could be connected in the manner described, and the invention would perform as described for the cases shown. The use of three and four VTT supplies was shown only for illustrative purposes, and was not intended to limit the invention to these number of supplies. Similarly, for illustrative purposes, the GTL bus was described for the case of 240 GTL signal lines. It is clear to one skilled in the art that many alternate groupings of signal lines are possible which would achieve the purposes of load balancing and topological convenience. As but one example, the GTL signal lines were shown spanning slots a through z in FIGS. 2, 3, and 5. It is possible for some of the signals to partially span the described slots, or to extend beyond the described slots, or for separate busses to span adjacent slots, and the current sharing VTT invention could be applied without loss of generality.

We claim:

1. A VTT termination system comprising:
   a plurality n of first resistors, each said resistor having a termination end and a VTT end;

a plurality n of second resistors, each said resistor having a termination end and a VTT end;

a plurality n of terminated signal lines, each said signal line having a first end connected to said first resistor termination end, a length of signal conductor, and a second end connected to said second resistor termination end;

a plurality m of termination nodes, each said termination node connected to a plurality of said first resistor VTT ends, or said second resistor VTT ends, where 1<m<n;

a plurality m of VTT power sources, each connected uniquely to one of m said termination nodes;

a plurality of current sharing resistors connected between said termination nodes.

2. The VTT termination system of claim 1 wherein a ratio formed by first termination resistor value divided by said second termination resistor value is less than 2 and greater than 0.5.

3. The VTT termination system of claim 1 wherein the ratio formed by the transmission line impedance of said length of signal conductor divided by either said first termination resistor value or said second termination resistor value is less than 2 and greater than 0.5.

4. The VTT termination system of claim 3 wherein said signal conductor is fabricated on a printed circuit board, and said first termination resistor and said second termination resistor are located on said printed circuit board.

5. The VTT termination system of claim 4 wherein said printed circuit board includes a ground plane layer electromagnetically coupled to said signal conductor.

6. The VTT termination system of claim 3 wherein the value of said current sharing resistors is causes less than a 5% drop in a given VTT node voltage when said VTT power supply stops delivering power to said node.

7. The VTT termination system of claim 3 wherein the value of said current sharing resistors attached to said node is $$Rcs < 0.10 VTT/I_{VTT(max)}$$

where

Rcs is the resistance of said current sharing resistor, $I_{VTT(max)}$ is the maximum VTT current drawn by said node.

8. The VTT termination system of claim 6 wherein said current sharing resistors are fabricated from printed wire traces on a backplane.

9. The VTT termination system of claim 6 wherein m said termination nodes have (m−1)+(m−2)+. . . 1 current sharing resistors connected in a mesh.

10. The VTT termination system of claim 3 wherein there are 2, 3, or 4 nodes.

11. The VTT termination system of claim 3 wherein each said m node is connected to at least 0.5*(2n/m) said VTT termination resistor ends, and no more than 2*(2n/m) said VTT termination resistor ends.

12. The VTT termination system of claim 3 wherein said signal lines have GTL signal levels.

13. A VTT termination system comprising:

a plurality n of first resistors, each said resistor having a termination end and a VTT end;

a plurality n of second resistors, each said resistor having a termination end and a VTT end;

a plurality n of terminated signal lines, each said signal line having a first end connected to said first resistor termination end, a length of signal conductor, and a second end connected to said second resistor termination end;

a plurality m of termination nodes, each said termination node connected to a plurality of said first resistor VTT ends, or said second resistor VTT ends, where 1<m<n;

a plurality m of VTT power sources, each connected uniquely to on eof m said termination nodes;

one or more $V_{ref}$ sources used by each said transceiver for determining a signal level;

a plurality of current sharing resistors connected between said termination nodes.

14. The VTT termination system of claim 13 where said $V_{ref}$ comprises the distribution of a single $V_{ref}$ to a slot.

15. The VTT termination system of claim 13 wherein said $V_{ref}$ comprises the distribution of $V_{ref}$ which is derived from at least one of said VTT power sources.

16. The VTT termination system of claim 13 wherein said $V_{ref}$ is derived from said VTT in said transceiver.

17. The VTT termination system of claim 15 wherein said $V_{ref}$ is derived from said VTT using a resistive divider.

18. The VTT termination system of claim 15 wherein $V_{ref}$ is derived form said VTT by subtracting a fixed voltage from VTT.

19. The VTT termination system of claim 15 wherein said $V_{ref}$ is derived from said VTT on said backplane and distributed to all said slots.

20. The VTT termination system of claim 15 wherein said $v_{ref}$ is derived from said VTT on said backplane using a resistive divider.

21. The VTT termination system of claim 15 wherein said $V_{ref}$ is derived from said VTT by subtracting a fixed voltage from VTT.

22. The VTT termination system of claim 15 wherein said signal lines have GTL signal levels.

* * * * *